US008620519B2

(12) United States Patent
Mukherjee et al.

(10) Patent No.: US 8,620,519 B2
(45) Date of Patent: Dec. 31, 2013

(54) KERNEL-BASED FAULT DETECTION SYSTEM AND METHOD

(75) Inventors: Joydeb Mukherjee, Bangalore (IN); Venkataramana B. Kini, Bangalore (IN); Sunil K. Menon, Golden Valley, MN (US)

(73) Assignee: Honeywell International Inc., Morristown, NJ (US)

( * ) Notice: Subject to any disclaimer, the term of this patent is extended or adjusted under 35 U.S.C. 154(b) by 1412 days.

(21) Appl. No.: 11/201,694

(22) Filed: Aug. 10, 2005

(65) Prior Publication Data

US 2006/0235599 A1    Oct. 19, 2006

Related U.S. Application Data

(60) Provisional application No. 60/672,619, filed on Apr. 18, 2005.

(51) Int. Cl.
*G01M 15/14* (2006.01)
*G06F 17/16* (2006.01)
*G06F 17/17* (2006.01)

(52) U.S. Cl.
CPC ............... *G01M 15/14* (2013.01); *G06F 17/16* (2013.01); *G06F 17/175* (2013.01)
USPC .............. 701/32.9; 702/35; 702/82; 702/179; 702/187; 702/196; 702/121

(58) Field of Classification Search
CPC ....... G06F 17/16; G06F 17/175; G01M 15/14
USPC ........ 701/32.9, 32.1, 31.9, 33.5, 100; 702/34, 702/35, 179, 187, 196
See application file for complete search history.

(56) References Cited

U.S. PATENT DOCUMENTS

| 2003/0067978 A1* | 4/2003 | Pirim ...................... 375/240.03 |
| 2003/0236661 A1 | 12/2003 | Burges |
| 2004/0176879 A1* | 9/2004 | Menon et al. .................... 701/1 |
| 2004/0176901 A1* | 9/2004 | Uluyol et al. ................ 701/100 |
| 2005/0021212 A1* | 1/2005 | Gayme et al. .................. 701/99 |
| 2005/0165519 A1* | 7/2005 | Ariyur et al. .................. 701/29 |
| 2005/0283909 A1* | 12/2005 | Mylaraswamy et al. ......... 5/420 |
| 2005/0288901 A1* | 12/2005 | Mylaraswamy et al. ..... 702/185 |

OTHER PUBLICATIONS

Ashit Talukder and David Casasent. A General Methodology for Simultaneous Representation and Discrimination of Multiple Object Classes. 1998. http://citeseer.ist.psu.edu/476702.html.*
A. Talukder and D. Casasent, General Methodology for Simultaneous Representation and Discrimination of Multiple Object Classes, Optical Engineering (Advances in Recognition Techniques), Mar. 1998.

(Continued)

*Primary Examiner* — Mark Hellner
*Assistant Examiner* — Ari M Diacou
(74) *Attorney, Agent, or Firm* — Ingrassia Fisher & Lorenz, P.C.

(57) ABSTRACT

An improved fault detection system and method is provided. The fault detection system and method combines the use of discrimination and representation based feature extraction to reliably detect symptoms of faults in turbine engines. Specifically, the fault detection system and method uses a kernel-based Maximum Representation Discrimination Features (MRDF) technique to detect symptoms of fault in turbine engines. The kernel-based MRDF system and method combines the use of discriminatory features and representation features in historical sensor data to facilitate feature extraction and classification of new sensor data as indicative fault in the turbine engine. Furthermore, the kernel-based MRDF technique facilitates the uncovering of nonlinear features in the sensor data, thus improving the reliability of the fault detection.

19 Claims, 2 Drawing Sheets

(56) References Cited

OTHER PUBLICATIONS

European Search Report EP 06112716.3, Aug. 28, 2006.
Goebel, at al, Rapid Detection of Faults for Safety Critical Aircraft Operation, 2004 IEEE Aerospace Conference Proccedings, p. 3372-3383.
Kim, et al., Kernel Principal Component Analysis for Texture Classification, IEEE Signal Processing Letters, vol. 8, No. 2, pp. 39-41, Feb. 2001.
Muller, et al, An Introduction to Kernel-Based Learning Algorithms, IEEE Transactions on Neutral Networks, vol. 12, No. 2, pp. 181-201, Mar. 2001.

* cited by examiner

KERNEL-BASED FAULT DETECTION SYSTEM AND METHOD

CROSS-REFERENCES TO RELATED APPLICATIONS

This application claims the benefit of U.S. Provisional Application No. 60/672,619, filed Apr. 18, 2005.

FIELD OF THE INVENTION

This invention generally relates to diagnostic systems, and more specifically relates to fault detection.

BACKGROUND OF THE INVENTION

Modern aircraft are increasingly complex. The complexities of these aircraft have led to an increasing need for automated fault detection systems. These fault detection systems are designed to monitor the various systems of the aircraft in an effect to detect potential faults. These systems are designed to detect these potential faults such that the potential faults can be addressed before the potential faults lead to serious system failure and possible in-flight shutdowns, take-off aborts, and delays or cancellations.

Engines are, of course, a particularly critical part of the aircraft. As such, fault detection for aircraft engines are an important part of an aircrafts fault detection system. Some traditional engine fault detection has been limited to only representation or discrimination based methods. While these methods have been effective in detecting some faults, they are less effective in detecting faults in systems where there are significant nonlinearities in the system. Many complex systems, such as turbine engines, have substantially nonlinear relationships between variables in the system. In these types of system, the nonlinear relationship between variables reduces the effectiveness of these linear techniques for fault detection. Thus, what is needed is an improved system and method for detecting faults in turbine engines.

BRIEF SUMMARY OF THE INVENTION

The present invention provides an improved fault detection system and method. The fault detection system and method combines the use of discrimination and representation based feature extraction to reliably detect symptoms of faults in turbine engines. Specifically, the fault detection system and method uses a kernel-based Maximum Representation Discrimination Features (MRDF) technique to detect symptoms of fault in turbine engines. The kernel-based MRDF system and method combines the use of discriminatory features and representation features in historical sensor data to facilitate feature extraction and classification of new sensor data as indicative fault in the turbine engine. Furthermore, the kernel-based MRDF technique facilitates the uncovering of nonlinear features in the sensor data, thus improving the reliability of the fault detection.

The fault detection system includes a kernel-based MRDF feature extractor that extracts salient features from turbine engine sensor measurements. This extraction reduces the original turbine sensor data into a substantially reduced set of variables that can be used to detect startup failure. The extracted salient features are passed to a classifier that analyzes the extracted salient features to determine if a fault has occurred in the turbine engine. Detected faults can then be passed to a diagnostic system where they can be passed as appropriate to maintenance personnel.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides an improved fault detection system and method. The fault detection system and method combines the use of discrimination and representation based feature extraction to reliably detect symptoms of faults in turbine engines. Specifically, the fault detection system and method uses a kernel-based Maximum Representation Discrimination Features (MRDF) technique to detect symptoms of fault in turbine engines. The kernel-based MRDF system and method combines the use of discriminatory features and representation features in historical sensor data to facilitate feature extraction and classification of new sensor data as indicative fault in the turbine engine. Furthermore, the kernel-based MRDF technique facilitates the uncovering of nonlinear features in the sensor data, thus improving the reliability of the fault detection.

Figure 1:
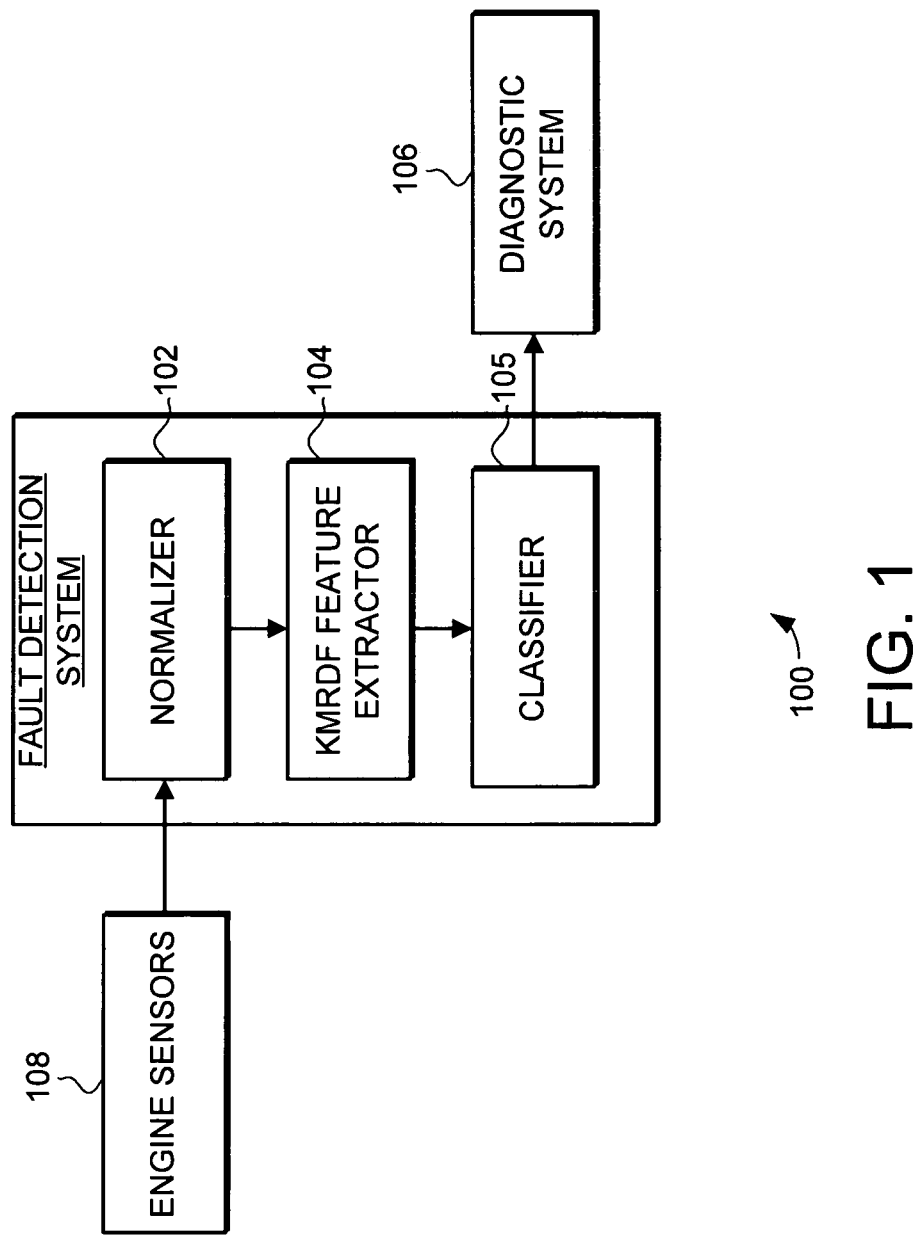
FIG. 1 is a schematic view of a fault detection system.

Turning now to FIG. 1, a fault detection system 100 is illustrated schematically. The fault detection system 100 includes a normalizer 102, a KMRDF feature extractor 104, and a classifier 105. The fault detection system 100 receives sensor data from the engine sensors 108. The fault detection system 100 determines the likelihood of fault in the turbine engine from the system data, and passes the results to the diagnostic system 106.

In general, the normalizer 102 receives the sensor data and corrects the sensor data to account for varying operating conditions. For example, a semi-empirical polynomial model of the engine can be used to correct for varying operating conditions and to account for engine idiosyncrasies. Of course, other techniques could also be used to normalize the sensor data. The sensor data used can comprise a variety of different types of sensor data measurements. For example, snap shot data from a turbine engine taken during takeoff, including air temperature, altitude, engine oil temperature, low pressure spool speed, high pressure spool speed, and exhaust gas temperature can be used.

The normalized sensor data is passed to the KMRDF feature extractor 104. In general, the KMRDF feature extractor 104 uses a kernel-based Maximum Representation Discrimination Features (MRDF) technique to detect symptoms of fault in turbine engines. This technique combines the use of a discriminatory features and representation features in historical sensor data to facilitate feature extraction and classification of new sensor data as indicative fault in the turbine engine. Specifically, when properly trained using historical sensor data from both good and bad engines, new sensor data from engine sensors 108 can be applied to the KMRDF feature extractor 104 to transform the sensor data into a KMRDF feature space. This results in a reduced set of features that can be effectively classified to determine the likelihood of fault in the turbine engine. As one example, the new sensor data is projected into an eigen-vector space obtained from a generalized eigen-decomposition. The components of the new sensor data are projected into the eigen-vector space as coordinates in the feature space. The coordinates of the projected data in the feature space are then passed to the classifier 105.

The classifier 105 then classifies the extracted features (i.e., the components in the feature space) to determine if the new sensor data is indicative of fault in the turbine engine. For example, the classifier 105 can determine how close (or far) the components are in some measure from the center of data from historical faulty engines, and can determine how close the components are from the center of data from historical good engines. In another embodiment, the classifier can determine the distance of the new point from all the points of the class representing faulty engine data and all the points of the class representing good engine data. By comparing these measurements, the classifier can determine whether the extracted features are indicative of fault in the turbine engine.

In one embodiment, the classifier 105 uses a closeness function to distinguish between two or more classes of sensor data, such as sensor data from good and bad turbine engines. The closeness function can be implemented not to depend on all the historical points in the classes. This is desirable because far away points may not have a significant effect on the closeness measure and hence considering neighboring points may be sufficient. Furthermore, using only neighboring points can result in computationally less demanding classification. As one example, the closeness function can comprise a Euclidean distance function.

In general, MRDF is a technique that can simultaneously represent features in a class (normal and fault) as well as discriminate/separate features among different classes. The kernel-based MRDF technique facilitates simultaneous capture of both representation and discrimination features in a higher dimensional nonlinear space.

The kernel-based MRDF technique additionally facilitates the capture of nonlinear correlations in the sensor data using a kernel function. Thus, this method can selectively extract nonlinear features that are useful for discrimination, representation, or joint representation and discrimination. In joint representation and discrimination feature extraction, the combination of extracted features between representation and discrimination can be selected using a weighting factor k. The use of nonlinear features helps ensure that the spread of projections of the samples in one class are large. Features for discrimination try to separate samples in different classes, while constraining samples in each class to be tightly packed. Features for representation and those for discrimination are thus complements of each other. However, features for representation typically do not ensure good classification between classes. They can typically achieve good classification between classes only when the centers of the classes are widely separated and the respective variance of the data for each of the classes is small.

The KMRDF technique uses a nonlinear kernel function to capture nonlinear correlations in the sensor data. The kernel function can be any suitable kernel function, such as a polynomial, tan hyperbolic or Gaussian function. As one specific example, the kernel function can comprise a polynomial kernel with a degree of two. In general, a kernel function is defined as a nonlinear mapping from input space to a higher dimensional space. Additionally, the higher dimensional space should have a vector inner product defined in it. An example of such a space is Hilbert space. To develop a KMRDF feature extractor, the kernel function is applied to historical sensor data, using both a representation features and discrimination features, to uncover nonlinear correlations in the sensor data.

As one example, a measure of nonlinear representation in the feature space $E_R$ can be defined as:

$$E_R = K_1 + K_2 \quad \text{Equation 1.}$$

where the feature space is defined using kernel matrices $K_1$ and $K_2$, where $K_1$ and $K_2$ are defined as:

$$K_{1ij} = \phi(x_i) \cdot \phi(x_j) \forall x_i, x_j \in \text{class1} \quad \text{Equation 2.}$$

$$K_{2ij} = \phi(x_i) \cdot \phi(x_j) \forall x_i, x_j \in \text{class2} \quad \text{Equation 3.}$$

where $\phi$ is the kernel function, and where $x_i$ and $x_j$ are historical sensor data from known good and bad turbine engines.

Likewise, a measure of nonlinear discrimination in the feature space $E_D$ can be defined as:

$$E_D = \frac{1}{cn} \sum_{i=1}^{n} \sum_{j=1}^{c} \tilde{\phi}_j(x^i) \tilde{\phi}_j(x^i)^T. \quad \text{Equation 4}$$

where $$\tilde{\phi}_j(x^i) = \bar{\phi}_j(x^i) - \bar{\phi}(x^i). \quad \text{Equation 5}$$

and where $\phi$ is the number of classes (e.g, good and bad sensor data classes), n is the total number of data points, and $\bar{\phi}_j(x^i)$ is the mean of data points in feature space in the local neighborhood of the point $\phi(x^i)$ with respect to class j, $\bar{\phi}(x^i)$ is the mean of data points in feature space in the local neighborhood of the point.

With the measure of representation $E_R$ and measure of discrimination $E_D$ so defined, the Kernel MRDF formulation can be defined as the optimization of:

$$\max(E_R + E_D) s.t. \|v_i\| = 1 \quad \text{Equation 6.}$$

The optimization of this formulation can be performed using a suitable technique, such as using eigen value decomposition. Specifically, where $\lambda$ is the eigen value, and v is the eigen vector, the decomposition problem can be defined as:

$$[kI + (1-k)K]^{-1}[kK + (1-k)\tilde{K}]v_i = \lambda_i v_i. \quad \text{Equation 7}$$

where, $\tilde{K} = K_1^T K_1 + K_2^T K_2$ and $K = K_1 + K_2$ assuming $K_1$ and $K_2$ are compatible for addition; and k is the weighting factor for discrimination versus representation and I is an identity matrix of appropriate dimension.

Specifically, the weighting factor k is preferably selected such that $0 \leq k \leq 1$. When k=0, the sum of $E_R$ and $E_D$ reduces to $E_D$, and only discriminatory features are obtained. Conversely, when k=1 the sum reduces only to $E_R$, and only representation features are obtained. When an intermediate value of k is used, simultaneous representation and discrimination features are obtained. Thus, by judiciously selecting the value of k between one and zero, the proportion to which the feature extractor will retain representation features or discrimination features from the sensor data can be determined. Thus, the system can be adapted for certain classes of faults such as abrupt faults that are more suitable to a discriminant-based classification method. Conversely, the system can also be adapted to classes of faults where gradual failure may be classified better using a representation-based method.

Equation 6 can be shown to be optimized with the solution obtained by solving the eigen decomposition formula given by Equation 7. This optimization results in the eigen vectors (directions) corresponding to the nonlinear feature space determined by the KMRDF method. With the nonlinear feature space so developed using historical sensor data, it can be implemented into a KMRDF feature extractor and used to transform new sensor data into a KMRDF feature space. Specifically, new sensor data after being normalized are projected along the extracted KMRDF directions and the projected values are outputted for classification. The projected values are the coordinates in the KMRDF feature space.

Thus, the fault detection system 100 would be developed and trained using historical sensor data from known good and known bad turbine engines. Specifically, the historical sensor data would be used to develop the KMRDF feature extractor. Additionally, the historical sensor data would be used to identify the class centers of extracted features in both good and bad turbine engines. The class centers can then be used by the classifier to classify new sensor data as indicative of fault in the turbine engine.

A detailed embodiment of a kernel-based fault detection system will now be discussed. In this example, the kernel-based fault detection system uses a KMRDF feature extractor for a two-spool, high bypass turbofan gas turbine engine. This engine can be conceptually divided into two main components: low pressure and high pressure. The low pressure section uses a gear reduction unit to drive a single stage fan off the two-stage, low pressure turbine. The high pressure system uses a double compressor and gear box, both driven by the high-pressure turbine.

In this turbine engine several different types of sensors are available. For example, total air temperature, altitude, mach number, engine oil temperature, fuel flow, low-pressure spool speed, high pressure spool speed and exhaust gas temperature are available. Using these sensors and the kernel-based fault detection system a variety of different types of faults can be detected. For example, high-pressure power section degradation, combustor liner rupture, bleed band leakage, and EGT sensor abrupt failure can all be detected.

As described above, the sensor data is preferably preprocessed by passing the sensor data through a semi-empirical polynomial model of the engine to correct and normalize for varying operating conditions and to account for engine idiosyncrasies. The outputs from the model are then inputted into the KMRDF feature extractor. The feature extractor, which has extracted the feature vectors during the training phase, will project the inputted data along the KMRDF directions and output the projected values. Thus, the classifier can then determine if they are indicative of a fault in the system. For example, the classifier can classify according to the closeness to the class centers in the feature space.

The KMRDF feature extractor provides several potential advantages. For example, using the KMRDF and kernel transformation various amounts of nonlinearity can be introduced and experimented with. Also, by using the kernel it is not required to compute inner products of large dimensional vectors in the expanded higher dimensional feature space. It may be noted that moving to higher dimensional feature space is necessary in some cases to achieve "linear separability" of feature clusters Thus, the KMRDF feature extractor provides the ability to locate higher order correlation information in the sensor data. This helps reduce the probability of false positives and thus improves the performance of the fault detection system. Furthermore, the KMRDF feature extractor provides the ability to improve fault detection by introducing a different between-class closeness measure that considers the local neighborhood of points rather than all pairs of points between two classes.

Figure 2:
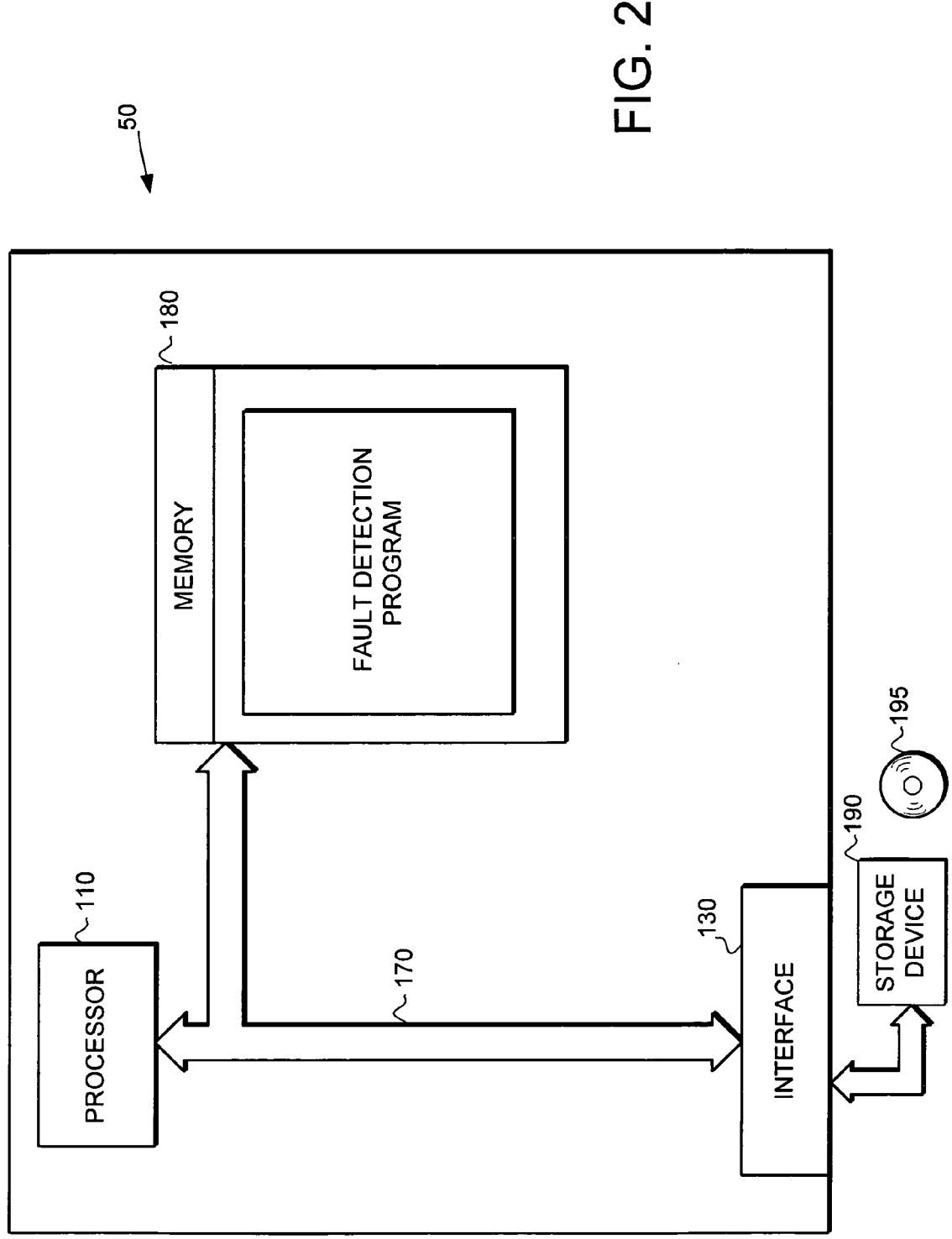
FIG. 2 is a schematic view of a computer system that includes a fault detection program.

The fault detection system and method can be implemented in wide variety of platforms. Turning now to FIG. 2, an exemplary computer system 50 is illustrated. Computer system 50 illustrates the general features of a computer system that can be used to implement the invention. Of course, these features are merely exemplary, and it should be understood that the invention can be implemented using different types of hardware that can include more or different features. It should be noted that the computer system can be implemented in many different environments, such as onboard an aircraft to provide onboard diagnostics, or on the ground to provide remote diagnostics. The exemplary computer system 50 includes a processor 110, an interface 130, a storage device 190, a bus 170 and a memory 180. In accordance with the preferred embodiments of the invention, the memory system 50 includes a fault detection program that uses a kernel based MRDF feature extractor.

The processor 110 performs the computation and control functions of the system 50. The processor 110 may comprise any type of processor, include single integrated circuits such as a microprocessor, or may comprise any suitable number of integrated circuit devices and/or circuit boards working in cooperation to accomplish the functions of a processing unit. In addition, processor 110 may comprise multiple processors implemented on separate systems. In addition, the processor 110 may be part of an overall vehicle control, navigation, avionics, communication or diagnostic system. During operation, the processor 110 executes the programs contained within memory 180 and as such, controls the general operation of the computer system 50.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 50. For example, a portion of memory 180 may reside on the vehicle system computer, and another portion may reside on a ground based diagnostic computer.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The interface 130 allows communication to the system 50, and can be implemented using any suitable method and apparatus. It can include a network interfaces to communicate to other systems, terminal interfaces to communicate with technicians, and storage interfaces to connect to storage apparatuses such as storage device 190. Storage device 190 can be any suitable type of storage apparatus, including direct access storage devices such as hard disk drives, flash systems, floppy disk drives and optical disk drives. As shown in FIG. 2, storage device 190 can comprise a disc drive device that uses discs 195 to store data.

In accordance with the preferred embodiments of the invention, the computer system 50 includes a KRMDF fault detection program. Specifically during operation, the fault detection program is stored in memory 180 and executed by processor 110. When being executed by the processor 110, the fault detection system monitors vehicle operation parameters to identify potential faults.

As one example implementation, the fault detection system can operate on data that is acquired from the mechanical system (e.g., aircraft) and periodically uploaded to an internet website. The KMRDF analysis is performed by the web site and the results are returned back to the technician or other user. Thus, the system can be implemented as part of a web-based diagnostic and prognostic system.

It should be understood that while the present invention is described here in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks (e.g., disk 195), and transmission media such as digital and analog communication links, including wireless communication links.

It should also be understood that while the present invention has been described as a fault detection system for turbine engines, the present invention can also be applied to other mechanical systems in general and other aircraft systems in particular. Examples of the types of aircraft systems that the present invention can be applied to include environmental control systems, aircraft hydraulic systems, aircraft fuel delivery systems, lubrication systems, engine starter systems, aircraft landing systems, flight control systems and nuclear, biological, chemical (NBC) detection systems.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A fault detection system for detecting faults in a turbine engine, the fault detection system comprising:
    a kernel-based Maximum Representation Discrimination Features (MRDF) feature extractor, the kernel-based MRDF feature extractor receiving measured turbine sensor data from the turbine engine, the kernel-based MRDF feature extractor using a nonlinear kernel function, the nonlinear kernel function comprising a nonlinear mapping of the measured turbine sensor data to a higher dimensional space, the kernel-based MRDF feature extractor using the nonlinear kernel function to extract features indicative of nonlinear correlations in the sensor data; and
    a classifier, the classifier receiving the extracted features and classifying the extracted features to determine if a fault occurred in the turbine engine,
    wherein the kernel-based MRDF feature extractor is developed using historical sensor data from known good and known bad turbine engines.

2. The system of claim 1 wherein the kernel-based MRDF feature extractor utilizes a kernel function with components developed using a generalized eigen-decomposition based on the historical sensor data.

3. The system of claim 1 wherein the kernel-based MRDF feature extractor simultaneously extracts features relating to representation of sensor data from good and bad turbine engines and relating to discrimination between the sensor data between good and bad turbine engines.

4. The system of claim 3 wherein the kernel-based MRDF feature extractor uses a weighting factor to weight features relating to representation and the features relating to discrimination.

5. The system of claim 1 wherein the classifier uses a closeness function to distinguish between extracted features corresponding to a good engine and extracted features corresponding to a bad engine.

6. An apparatus comprising:
    a processor;
    a memory coupled to the processor;
    a fault detection program residing in the memory and being executed by the processor, the fault detection program including:
        a kernel-based Maximum Representation Discrimination Features (MRDF) feature extractor, the kernel-based MRDF feature extractor receiving measured turbine sensor data from a turbine engine, the kernel-based MRDF feature extractor using a nonlinear kernel function, the nonlinear kernel function comprising a nonlinear mapping of the measured turbine sensor data to a higher dimensional space, the kernel-based MRDF feature extractor using the nonlinear kernel function to extract features indicative of nonlinear correlations in the sensor data; and
        a classifier, the classifier receiving the extracted features and classifying the extracted features to determine if a fault occurred in the turbine engine,
        wherein the kernel-based MRDF feature extractor is developed using historical sensor data from known good and known bad turbine engines.

7. The apparatus of claim 6 wherein the kernel-based MRDF feature extractor utilizes a kernel function with components developed using a generalized eigen-decomposition based on the historical sensor data.

8. The apparatus of claim 6 wherein the kernel-based MRDF feature extractor simultaneously extracts features relating to representation of sensor data from good and bad turbine engines and relating to discrimination between the sensor data between good and bad turbine engines.

9. The apparatus of claim 8 wherein the kernel-based MRDF feature extractor uses a weighting factor to weight features relating to representation and the features relating to discrimination.

10. The apparatus of claim 6 wherein the classifier uses a closeness function to distinguish between extracted features corresponding to a good engine and extracted features corresponding to a bad engine.

11. A program product comprising:
    a) a fault detection program, the fault detection program including:
        a kernel-based Maximum Representation Discrimination Features (MRDF) feature extractor, the kernel-based MRDF feature extractor receiving measured turbine sensor data from a turbine engine, the kernel-based MRDF feature extractor, the nonlinear kernel function comprising a nonlinear mapping of the measured turbine sensor data to a higher dimensional space, the kernel-based MRDF feature extractor using the nonlinear kernel function using a nonlinear kernel function to extract features indicative of nonlinear correlations in the sensor data; and a classifier, the classifier receiving the extracted features and classifying the extracted features to determine if a fault occurred in the turbine engine; and b) computer-readable signal bearing media bearing said program, wherein the kernel-based MRDF feature extractor is developed using historical sensor data from known good and known bad turbine engines.

12. The program product of claim 11 wherein the kernel-based MRDF feature extractor utilizes a kernel function with components developed using a generalized eigen-decomposition based on the historical sensor data.

13. The program product of claim 11 wherein the kernel-based MRDF feature extractor simultaneously extracts features relating to representation of sensor data from good and bad turbine engines and relating to discrimination between the sensor data between good and bad turbine engines.

14. The program product of claim 13 wherein the kernel-based MRDF feature extractor uses a weighting factor to weight features relating to representation and the features relating to discrimination.

15. The program product of claim 11 wherein the classifier uses a closeness function to distinguish between extracted features corresponding to a good engine and extracted features corresponding to a bad engine.

16. A method of detecting faults in a turbine engine, the method comprising the steps of:
   receiving measured turbine sensor data from the turbine engine;
   extracting features indicative of nonlinear correlations in the sensor data from the sensor data using a kernel-based Maximum Representation Discrimination Features (MRDF) extraction technique using a nonlinear kernel function, the nonlinear kernel function comprising a nonlinear mapping of the measured turbine sensor data to a higher dimensional space; and
   classifying the extracted features to determine if a fault occurred in the turbine engine,
   wherein the kernel-based MRDF extraction technique is developed using historical sensor data from known good and known bad turbine engines.

17. The method of claim 16 wherein the kernel-based MRDF extraction technique utilizes a kernel function with components developed using a generalized eigen-decomposition based on the historical sensor data.

18. The method of claim 16 wherein the kernel-based MRDF extraction technique simultaneously extracts features relating to representation of sensor data from good and bad turbine engines and relating to discrimination between the sensor data between good and bad turbine engines.

19. The method of claim 18 wherein the kernel-based MRDF extraction technique uses a weighting factor to weight features relating to representation and the features relating to discrimination.

\* \* \* \* \*